(12) United States Patent
Van (10) Patent No.: US 6,478,669 B1
(45) Date of Patent: Nov. 12, 2002

(54) METHOD FOR VENTILATING CARGO IN SHIPPING CONTAINERS

(76) Inventor: Jerry E. Van, 630 S. Oaks Ave., Ontario, CA (US) 91762-4021

( * ) Notice: Subject to any disclaimer, the term of this patent is extended or adjusted under 35 U.S.C. 154(b) by 0 days.

(21) Appl. No.: 09/876,422

(22) Filed: Jun. 6, 2001

(51) Int. Cl.⁷ .................................................. B60H 1/00
(52) U.S. Cl. ........................................ 454/118; 62/239
(58) Field of Search ............................ 454/118, 77, 79, 454/88; 62/239

(56) References Cited

U.S. PATENT DOCUMENTS

| | | | | |
|---|---|---|---|---|
| 4,122,761 A | * | 10/1978 | Westin et al. ................. | 220/1.5 |
| 4,351,230 A | * | 9/1982 | Brickner et al. .............. | 34/235 |
| 4,517,882 A | * | 5/1985 | Watanabe et al. ........... | 454/118 |
| 5,706,662 A | * | 1/1998 | Van .............................. | 410/46 |
| 5,851,143 A | * | 12/1998 | Hamid ..................... | 312/223.6 |
| 6,007,419 A | * | 12/1999 | Bessire ................ | 126/343.5 A |

* cited by examiner

*Primary Examiner*—Harold Joyce
*Assistant Examiner*—Derek S. Boles
(74) *Attorney, Agent, or Firm*—Denton L. Anderson; Sheldon & Mak

(57) ABSTRACT

A method for shipping cargo in an enclosed elongated cargo container van comprising the steps of: (a) loading the cargo in the boxes, (b) stacking the boxes within the container van, (c) disposing a baffle sheet horizontally across vertical channels disposed between the cargo boxes, (d) providing baffle sheet openings within the baffle sheet in a configuration calculated to provide a predetermined pressure gradient across the cargo load, and (e) commencing the circulation of a ventilating gas through the cargo load from the bottom of the cargo load to the top of the cargo load.

19 Claims, 6 Drawing Sheets fig.11 fig.12

METHOD FOR VENTILATING CARGO IN SHIPPING CONTAINERS

FIELD OF THE INVENTION

This invention relates generally to methods for shipping cargo where the cargo requires ventilation. More specifically, the invention relates to methods for shipping cargo requiring ventilation in enclosed containers, such as container vans.

BACKGROUND OF THE INVENTION

Various kinds of cargo is preferably shipped in the manner whereby the cargo is continuously ventilated by the circulation of ventilating gases. For example, where the cargo needs to be refrigerated, it is desirable to circulate chilled air throughout the cargo. Also, where the cargo consists of fresh produce, it is frequently desirable to circulate gaseous ripening agents and/or insecticides throughout the cargo.

Some produce, such as green bananas, emit gases as they ripen. Such gases tend to accumulate around the fruit. The gas generates additional heat which, in turn, tends to accelerate the ripening process (thereby causing the emission of additional gases). Accordingly, if the ripening gases are not sufficiently exhausted, the produce will ripen unduly rapidly and unevenly. Much of the produce may, thereby, become overripened and spoiled during shipment.

Most cargo is now shipped in container vans having approximately the size and shape of a conventional semi truck trailer. Shipment by such container vans is by far the most common method of shipping cargo on land, by sea and by rail. The popularity of shipping via container vans stems from the fact that such container vans can be conveniently loaded off-site from the transportation distribution center (harbor, railhead or truck distribution center) and transported all the way to the final destination via any one or more of several shipment modes (by sea, land or rail) without having to be unloaded and reloaded at each distribution center. Attempts to solve the need for ventilating certain cargo, therefore, revolves around methods of providing adequate ventilation within container vans.

The present industry standard for ventilating cargo within container vans is to place the cargo in boxes and to then stack the boxes, either individually or on pallet boards, within container vans having some form of perforated floor, such as a grating. After the cargo boxes are located into the container van, an attempt is made to circulate ventilation gases from the lower portion of the forward end wall of the container van, up through the perforated floor, and up through the boxes. The ventilation gases are then accumulated at the top of the container van and removed by a vacuum drawn at the upper portion of the forward wall.

This conventional method of ventilating container vans is not very effective. The problem is that once ventilating gases are injected into the floor of the container van at the forward end wall, the gases immediately begin rising up through cargo boxes at the forward end of the container van. Much of the ventilation gases passes rapidly around the boxes through vertical chambers formed in the loading process. Because so much of the ventilating gases leak upwardly through the vertical chambers at the forward end of the cargo load, little of the ventilation gases reaches the rearward end of the container van.

In U.S. Pat. Nos. 5,116,191 and 5,706,662, both of which are incorporated herein by this reference, two different methods are proposed to address the aforementioned problems. Both of these prior art methods, however, require the stacking of the cargo on pallet boards using special packing and retaining techniques, such that internal channels are generated within the cargo load. The use of such special stacking and retaining techniques, however, has not been well received in the industry. The industry continues to prefer to load boxes within container vans by simply stacking the boxes upon one another, either individually or on pallets, without having to employ the special stacking and retaining techniques.

Accordingly, there is a need for an improved method of shipping cargo requiring ventilation, which is adapted to the industry preference for avoiding special stacking and retaining techniques and which otherwise avoids the aforementioned problems in the prior art.

SUMMARY

The invention satisfies this need. The invention is a method for shipping cargo in an enclosed, elongated cargo container van. The invention comprises the steps of (a) loading the cargo into boxes having a pair of opposed vertical side walls, a pair of opposed vertical end walls, a top wall and a bottom wall, (b) disposing the boxes in a plurality of tiers within the cargo container to form a cargo load having a top side and a bottom side, the boxes being disposed within the cargo container such that boxes in the forward portion of the enclosed space are tightly packed proximate to the sidewalls and to the forward end wall, the boxes being disposed within the cargo container so as to provide a plurality of vertical channels spaced apart from the side walls and spaced apart from the forward end wall, the vertical channels each extending from the bottom of the cargo load to the top of the cargo load, (c) disposing a baffle sheet horizontally across each vertical channel, at least some of the baffle sheets having one or more baffle sheet openings to allow the passage of gas through the baffle sheet, the number of baffle sheet openings in each baffle sheet being chosen so as to provide for a predetermined pressure gradient above the cargo load when a gas is circulated through the cargo load from the bottom of the cargo load to the top of the cargo load, and (d) commencing the circulation of a gas through the cargo load from the bottom of the cargo load to the top of the cargo load.

DRAWINGS

These features, aspects and advantages of the present invention will become better understood with regard to the following description, appended claims and accompanying figures where:

FIG. 6 is a transverse sectional view of the cargo load illustrated in FIG. 5;

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

Figures 1, 2:
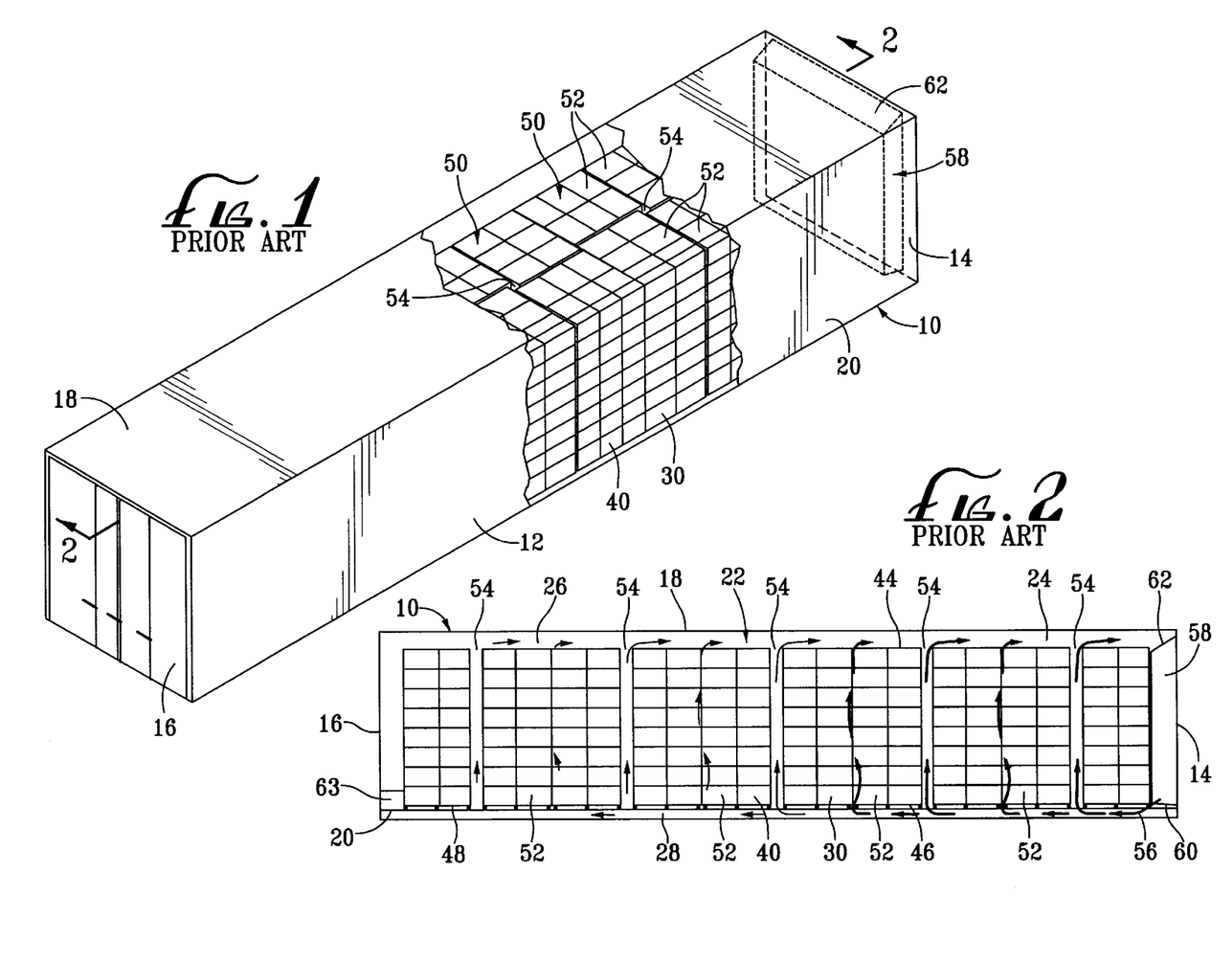
FIG. 1 is an isometric view of a loading scheme for a cargo van of the prior art.
FIG. 2 is a cross-sectional side view of the cargo van illustrated in FIG. 1 showing the flow of ventilation gases through the cargo.

The invention is a method for shipping cargo in an enclosed elongated cargo container van 10. A typical cargo container van 10 is illustrated in FIG. 1. The cargo container van 10 comprises a pair of opposed side walls 12, a forward end 14, a rearward end 16, a roof 18 and a floor 20. The cooperation of these six walls forms an enclosed space 22 having a forward portion 24 and a rearward portion 26. Typically, the floor 20 is perforated such as by being a "T" floor with an upper surface provided by a grating. The floor 20 is disposed above a horizontal ventilation channel 28.

Within the container van 10 are disposed boxes 30 containing cargo requiring ventilation. The method of the invention is ideal where the cargo is produce such as green bananas. Where the produce comprises green bananas, the boxes 30 typically have a pair of opposed vertical side walls 32, a pair of opposed vertical end walls 34, a top wall 36 and a bottom wall (not shown). Each box 30 is typically 15 ½ inches wide, 20 inches long and 10 inches high. The top wall 36 and the bottom wall of each box 30 is perforated to allow the flow of ventilation gases 56 through the box 30.

The boxes 30 are disposed in a plurality of tiers 40 within the cargo container 10 to form a cargo load 42 having a top side 44 and a bottom side 46. The boxes 30 are disposed within the cargo container 10 such that the boxes 30 in the forward portion 24 of the enclosed space 22 are tightly packed proximate to the side walls 12 and to the forward wall 14.

In a typical embodiment, such as illustrated in FIG. 1, the boxes 30 are disposed on individual pallet boards 48. In one embodiment, the cargo container 10 is about 7½ feet in width and each pallet board 48 is typically about 48 inches in length and about 41 inches in width. Such dimensions allow the pallet boards 48 to be tightly packed within the cargo container 10 with little or no space between the cargo load 42 and the side walls 12 of the cargo van 10, at least in the forward portion 24 of the cargo van 10. Such a configuration is illustrated in FIG. 1.

In the configuration illustrated in FIG. 1, the pallet boards 48 are placed side by side between the two side walls 12 of the cargo container 10, one pallet board 48 having its long side disposed in parallel with the side walls 12 of the cargo container 10 and the other pallet board 48 having its long side disposed perpendicular to the side walls 12 of the cargo container 10. Thus, as can be seen in FIG. 1, the cargo load 42 comprises a plurality of pallet board load combinations 50, each pallet board load combination 50 consisting of the four pallet board loads 52 disposed on four individual pallet boards 48 arranged in close proximity to one another. When so disposed, the four pallet board loads 52 in each pallet board load combination 50 define a central vertical channel 54 at the intersection of the four pallet board loads 50 which extend from the bottom side 46 of the cargo load 42 to the top side 44 of the cargo load 42. In a typical embodiment, each central vertical channel 54 has a cross-section which is approximately 6 inches by 6 inches.

As illustrated in FIG. 2, ventilation gases 56 can be flowed through the cargo load 42 from a blower (not shown) disposed within a bulkhead 58 located at the forward-most portion of the container van 10. The bulkhead 58 has one or more ventilation outlet openings (not shown) disposed along a bottom wall 60 of the bulkhead 58. The bulkhead 58 also has one or more inlet openings (not shown) disposed along a top wall 62 of the bulkhead 58. A block of thermoplastic foam 63 is typically disposed at the rearward end 16 of the cargo van 10 to prevent the flow of ventilation gases 56 up around the rear-most end of the cargo load 42. Instead of a block of foam, a sheet baffle can be used. In operation, the blower directs ventilation gases 56 from the bulkhead 58 via the outlet openings and into the ventilation channel 28 beneath the perforated floor 20. At the same time, the blower draws a vacuum along the top of the cargo load 42. As the ventilation gases 56 flow through the ventilation channel 28, gases 56 are drawn upward through the perforated floor 20 into the cargo load 42. The gases 56 are further drawn upward through the perforations in the boxes 30, thereby ventilating the cargo within the boxes 30. Above the cargo load 42, the ventilation gases 56 are drawn into the bulkhead 58 through the inlet openings in the bulkhead 58.

As can be seen in FIG. 2, a significant portion of the ventilation gases 56 pass through the vertical channels 54 rather than through the boxes 30. In fact, so much of the ventilation gases 56 pass through the vertical channels 54, that the amount of ventilation gases 56 traveling to the rearward portion 26 of the cargo container 10 is significantly diminished. As illustrated in FIG. 2, the amount of ventilation gases 56 available to ventilate the cargo in the rearward portion 26 of the cargo container 10 can be negligible. The method of the invention is directed to this problem.

In the method of the invention, as illustrated in FIGS. 3–13, a baffle sheet 64 is disposed across each of the vertical channels 54 within the cargo load 42. The baffle sheets 64 are typically, but not necessarily, thin, flat structures and can be made from a variety of inexpensive materials, such as paper, cardboard, plastic and sheet metal.

Figures 3, 4:
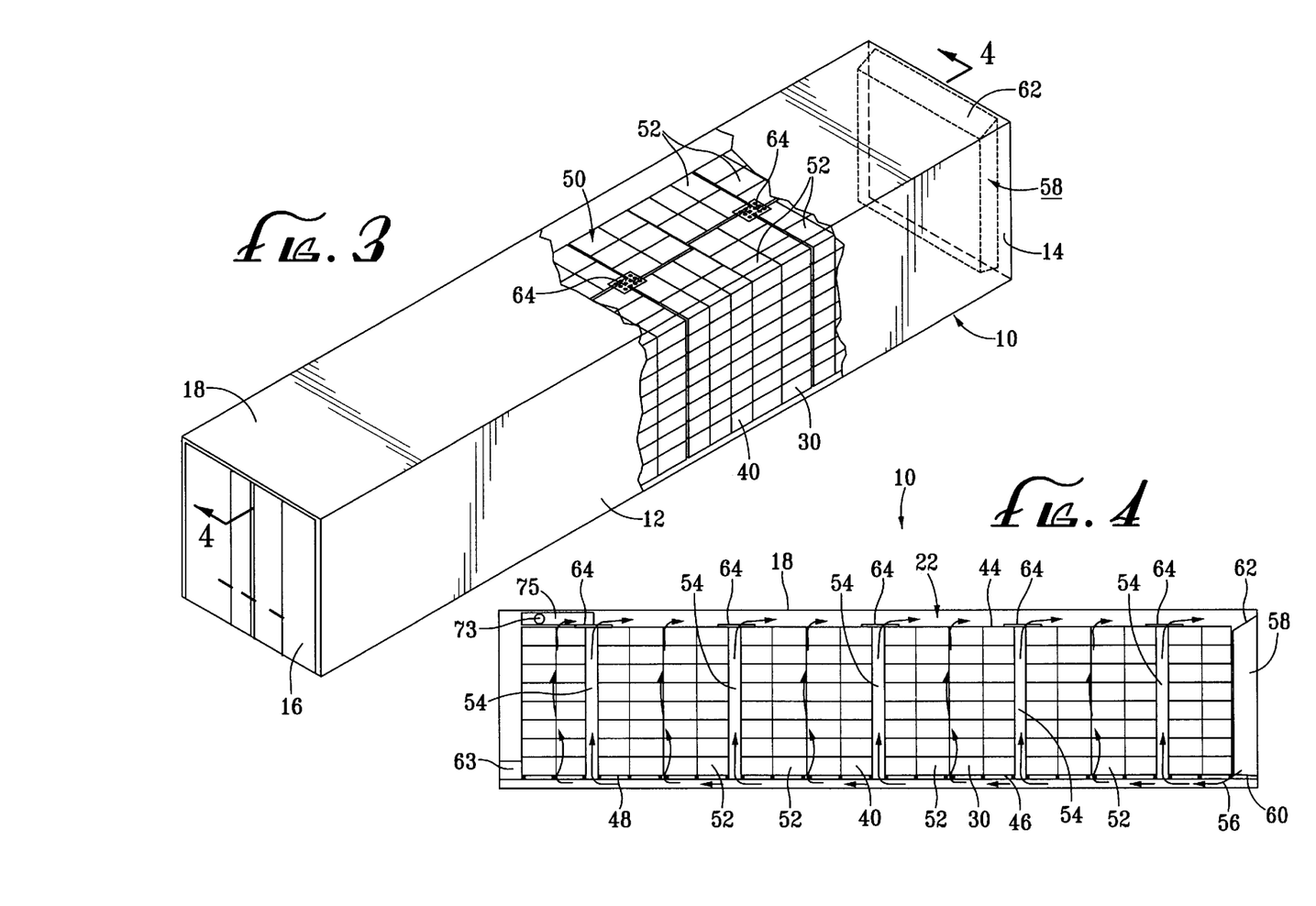
FIG. 3 is an isometric view of a cargo van employing the method of the invention.
FIG. 4 is a cross-sectional side view of the cargo van illustrated in FIG. 3 showing the flow of ventilation air through the cargo load.
Figures 5, 8:
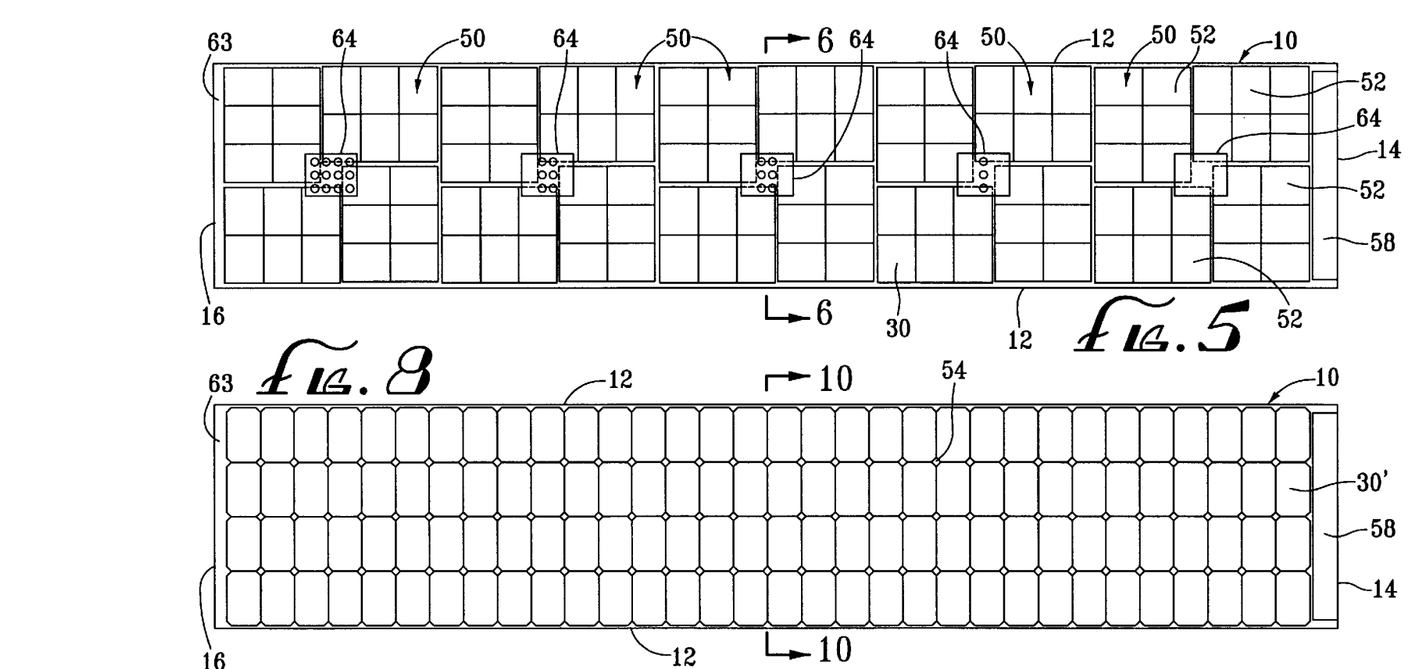
FIG. 5 is a top view of the cargo load within the cargo van illustrated in FIG. 3.
FIG. 8 is a top view of an alternative cargo load disposed within a cargo van.
Figure 7A:
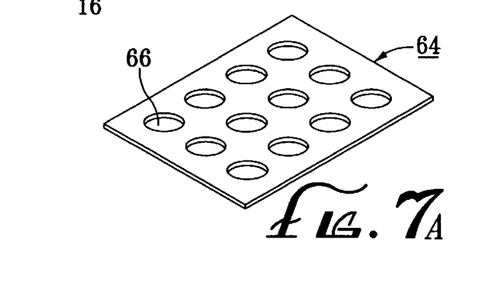
FIG. 7A is an isometric view of a baffle sheet useable in the method of the invention.
Figure 7B:
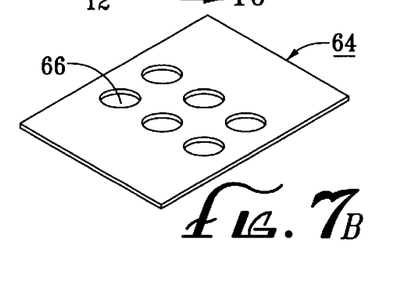
FIG. 7B is an isometric view of a second baffle sheet useable in the method of the invention.
Figure 7C:
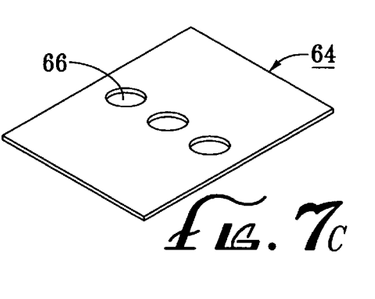
FIG. 7C is an isometric view of a third baffle sheet useable in the method of the invention.
Figures 7D, 10:
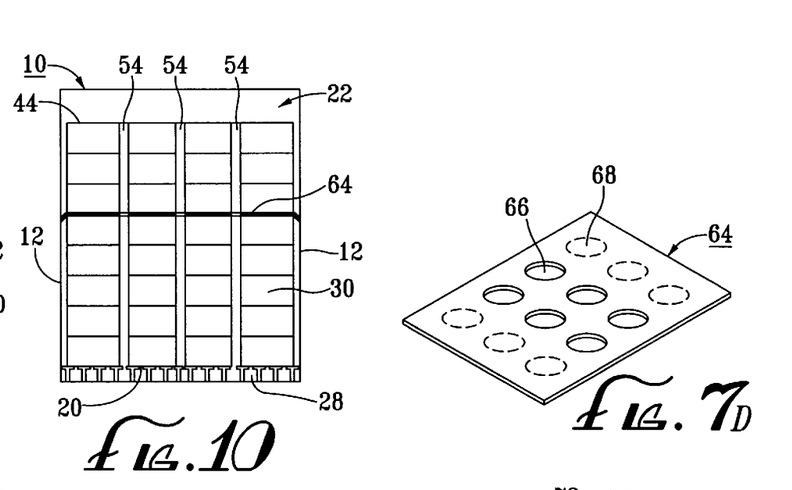
FIG. 7D is an isometric view of a fourth baffle sheet useable in the method of the invention.
FIG. 10 is a transverse sectional view of the container load illustrated in FIG. 8.
Figure 7E:
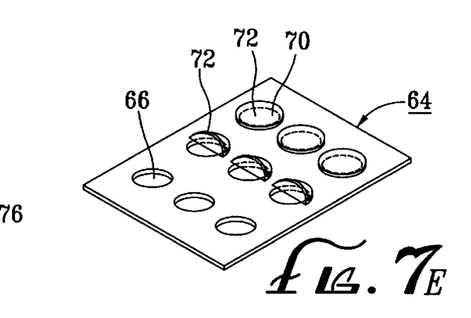
FIG. 7E is an isometric view of a fifth baffle sheet useable in the method of the invention.
Figures 7F, 7G, 13:
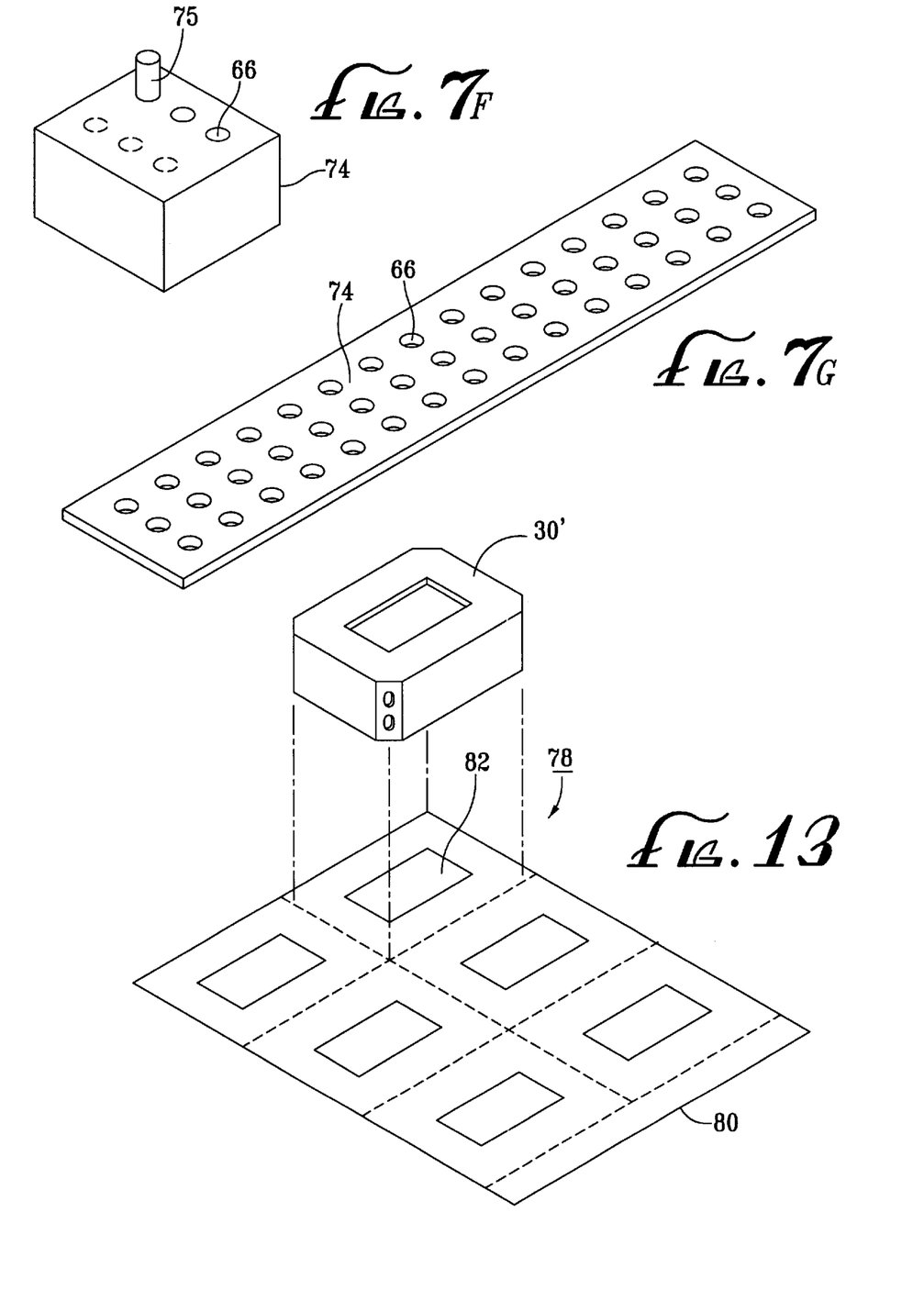
FIG. 7F is an isometric view of a sixth baffle sheet useable in the method of the invention.
FIG. 7G is an isometric view of a seventh baffle sheet useable in the method of the invention.
FIG. 13 is an isometric view of a large baffle useable in the invention.
Figure 8:
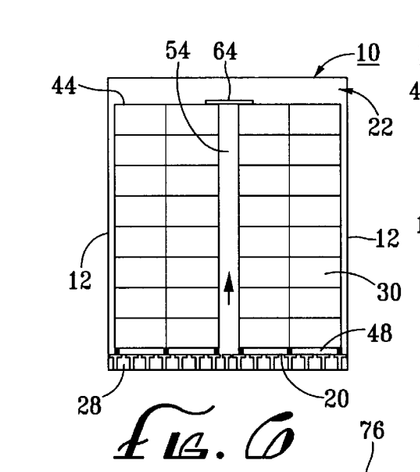
Figure 9:
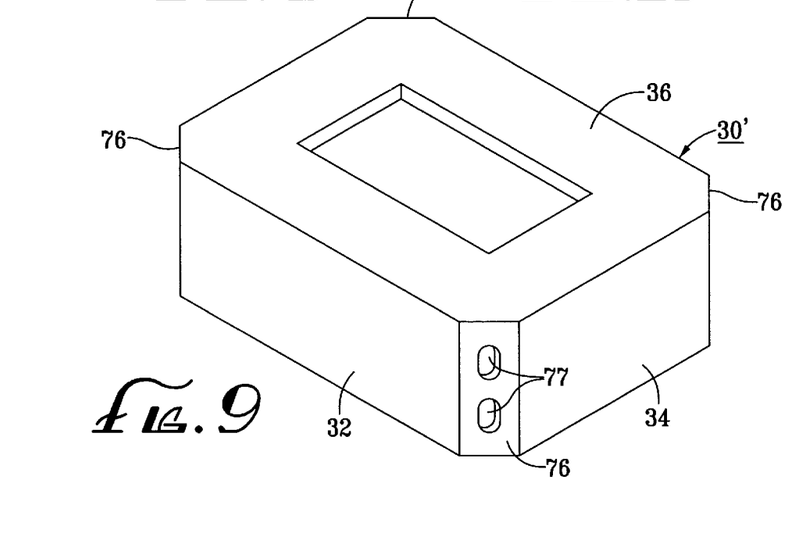
FIG. 9 is an isometric view of a box useable in the cargo load illustrated in FIG. 8.

At least some of the baffle sheets 64 comprise one or more baffle sheet openings 46 to allow the passage of gases through the baffle sheet 64. In a typical embodiment, the baffle sheet openings 66 are circular and have a diameter between about ¼ inch and about 1 inch. FIGS. 7A, 7B and 7C illustrate three different baffle sheets 64, having differing numbers of baffle sheet openings 66. FIG. 7D illustrates a baffle sheet 64 having perforated cut-outs 68 which allow the user to open differing numbers of baffle sheet openings 66 in the baffle sheet 64, as desired. FIG. 7E illustrates a baffle sheet 64 wherein some or all of the baffle sheet openings 66 are covered with a tape or similar covering 70 which can be peeled back. Such peel-back portions 72 can be used to wholly expose a baffle sheet opening 66 or partially expose a baffle sheet opening 66. FIG. 7F illustrates a baffle sheet 64 which is a block of thermoplastic foam having removable foam cylinders to expose baffle sheet openings 66. This embodiment of the baffle sheet 64 can be conveniently wedged into a vertical channel 54 when the pallet board loads 52 are assembled into a pallet board load combination 50. The wedging of this embodiment of a baffle sheet 64 can be conveniently accomplished at any level within the ventilation channel 54, usually without use of adhesives or other kinds of fastening means. FIG. 7G illustrates a baffle sheet 64 which is a long strip of material having baffle sheet openings 66 disposed therein. The baffle sheet openings 66 can be cut-outs 68 similar to the embodiment illustrated in FIG. 7D. The baffle sheet openings 66 can also be covered with a covering 70 similar to the embodiment illustrated in FIG. 7E. The baffle sheet 64 illustrated in FIG. 7G is just wide enough to cover the vertical channels 54 within an alternative container loading configuration illustrated in FIG. 8, discussed below.

Where the cargo load 42 is comprised of individual pallet board loads 52 as illustrated in FIG. 3, the baffle sheets 64 are typically disposed on the top side 44 of the cargo load 42 as illustrated in FIGS. 5 and 6. The baffle sheets 64 can be physically attached to the top side 44 of the cargo load 42 by adhesives, tapes or other suitable means.

FIG. 5 illustrates a typical configuration wherein the baffle sheet 64 most proximate to the forward end of the cargo container 10 has no openings 66, thereby wholly closing the forward-most vertical channel 54 within the cargo load 42. The second vertical channel 54 is covered with a baffle sheet 64 with three openings 66. The third and fourth vertical channels 54 are covered with baffle sheets 64 having six openings 66 and the baffle sheet 64 disposed at the rearward-most portion of the cargo van 10 is covered with a baffle sheet 64 having 12 openings 66. In this typical example, the baffle sheets 64 are used to provide for a predetermined pressure gradient above the cargo load 42 when ventilation gases 56 are circulated through the cargo load 42 from the bottom of the cargo load 42 to the top of the cargo load 42. Typically, the predetermined pressure gradient is one in which equal quantities of ventilation gases 56 are drawn upwards through each portion of the cargo load 42.

As illustrated in FIG. 3, one or more fans 73 disposed within a removable fan housing 75 can be slipped onto the top of the cargo load 42 via the rearward end 16 of the container van 10 to provide additional circulating power for ventilation gases 56 flowing within the rearward portion 26 of the enclosed space 22.

FIG. 8 illustrates an alternative container loading configuration to which the method of the invention can be applied. In this configuration, specially constructed boxes 30' are stacked one on top of another (without use of pallet boards 48) within the cargo van 10. Each box 30' has the configuration illustrated in FIG. 9 with four biased corners 76. Each box 30' has corner vents 77 disposed at each of the four biased corners 76. When the boxes 30' are stacked as illustrated in FIG. 8, vertical channels 54 within the cargo load 42 are provided at the intersection of the four individual boxes 30' in each tier 40 within the load 42. The corner vents 77 within each of the boxes 30' allow ventilation gases 56 to enter the boxes 30' directly from the vertical channels 54. The corner vents 77 thus provide important additional ventilation passageways into each box 30'.

In the embodiment illustrated in FIG. 8, the baffle sheets 64 are of the type illustrated in FIG. 7G. In the embodiment illustrated in FIG. 8, the baffle sheets 64 can be conveniently disposed between the top side 44 and the bottom side 46 of the cargo load 42 as illustrated in FIG. 10. In this disposition of the baffle sheets 64, the baffle sheets 64 are secured within the cargo load 42 merely by the weight of boxes 30 situated above the baffle sheet 64. Thus, no adhesives, tapes or other attachment methods are required to secure the baffle sheets 64 in place.

Figure 11:
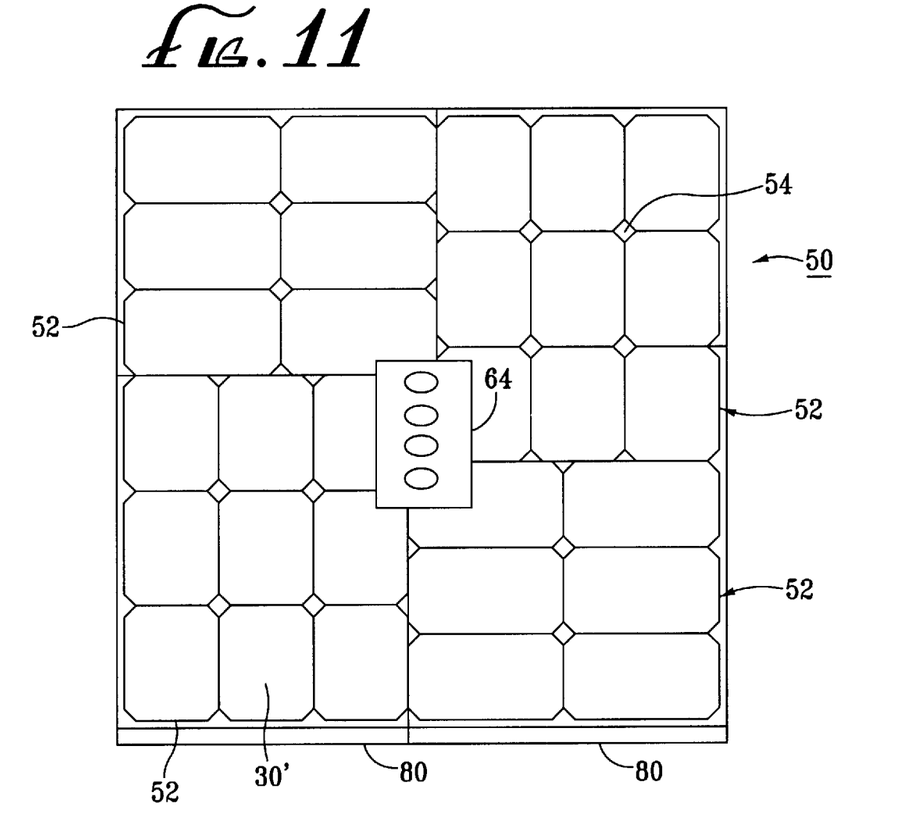
FIG. 11 is a plan view of a pallet board load combination having features of the invention.
Figure 12:
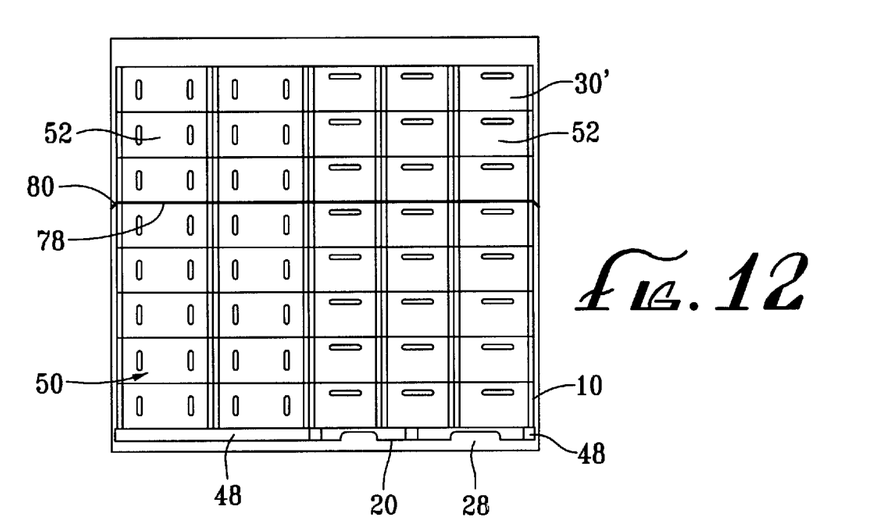
FIG. 12 is an end view of the pallet board load combination illustrated in FIG. 11.

FIG. 11 illustrates an alternative pallet board combination 50 useable in the invention. In the pallet board combination 50 illustrated in FIG. 11, boxes 30' are disposed on individual pallet boards 48 as illustrated in FIGS. 11 and 12. A large baffle 78, such as illustrated in FIG. 13, is disposed within each pallet board load 52 forcing ventilation gases 56 to percolate upwards through each of the six boxes 30' in each tier 40 of each pallet board load 52 by closing off each of the vertical channels 54 formed by the biased corners 76 of the boxes 30'. Also, the large baffle 78 may include an extension flap 80 which can be used to drag several tiers of boxes 30' out through the rearward end 16 of the cargo van 10. As illustrated in FIG. 11, a baffle sheet 64 is disposed across the vertical channel 54 formed by the intersection of the four pallet board loads 52.

By the embodiment illustrated in FIGS. 11–13, ventilation gases 56 are forced to be drawn upwards through the boxes 30' by gas flow traveling vertically through openings disposed in the bottom walls of the boxes 30'. Ventilation gases 56 are also drawn laterally into each of the boxes 30' from gases flowing within the several vertical channels 54 via the corner vents 77 in the biased corners 76 of each box 30'.

The invention is conveniently used for a wide variety of ventilating schemes. The method is useable wherein the ventilation gases 56 comprise ambient air, refrigerated air, a ripening agent and/or a preserving agent. having thus described the invention, it should be apparent that numerous structural modifications and adaptations may be resorted to without departing from the scope and meaning of the invention as set forth above and as described hereinbelow by the claims.

What is claimed is:

1. A method for shipping cargo in an enclosed, elongated cargo container van having opposed vertical side walls, a forward end wall, a rearward end wall, a roof and a floor so as to form an enclosed space, the enclosed space having a forward portion and a rearward portion, the method comprising the steps of:

(a) loading the cargo into boxes having a pair of opposed vertical side walls, a pair of opposed vertical end walls, a top wall and a bottom wall;

(b) disposing the boxes in a plurality of tiers within the cargo container to form a cargo load having a top side and a bottom side, the boxes being disposed within the cargo container such that boxes in the forward portion of the enclosed space are tightly packed proximate to the sidewalls and to the forward end wall, the boxes being disposed within the cargo container so as to provide a plurality of vertical channels spaced apart from the side walls and spaced apart from the forward end wall, the vertical channels each extending from the bottom of the cargo load to the top of the cargo load;

(c) disposing a baffle sheet horizontally across each vertical channel, at least some of the baffle sheets having one or more baffle sheet openings to allow the passage of gas through the baffle sheet, the number of baffle sheet openings in each baffle sheet being chosen so as to provide for a predetermined pressure gradient above the cargo load when a gas is circulated through the cargo load from the bottom of the cargo load to the top of the cargo load; and (d) commencing the circulation of a gas through the cargo load from the bottom of the cargo load to the top of the cargo load.

2. The method of claim 1 wherein the boxes are disposed within the cargo containers such that boxes in both the forward portion and the rearward portion of the enclosed space are tightly packed proximate to the side walls.

3. The method of claim 1 wherein the boxes are stacked in a plurality of tiers on individual pallet boards to form pallet board loads and wherein the pallet boards are disposed within the cargo container to form the cargo load.

4. The method of claim 3 wherein each of the vertical channels are formed by the intersection of four individual pallet board loads.

5. The method of claim 3 wherein the boxes have biased corners and wherein a plurality of the vertical channels are formed in each tier within the pallet load by the intersection of the biased corners from four individual boxes.

6. The method of claim 1 wherein the baffle sheet is made from cardboard.

7. The method of claim 1 wherein the baffle sheet is made from paper.

8. The method of claim 1 wherein the baffle sheet openings comprise cut-outs.

9. The method of claim 1 wherein the baffle sheet openings comprise perforated portions.

10. The method of claim 1 wherein the baffle sheet openings comprise peel-back portions.

11. The method of claim 1 wherein a plurality of the baffle sheets are disposed at the top of the cargo load.

12. The method of claim 1 wherein a plurality of the baffle sheets are disposed between the top and the bottom of the cargo load.

13. The method of claim 1 wherein the gas comprises ambient air.

14. The method of claim 1 wherein the gas comprises refrigerated air.

15. The method of claim 1 wherein the gas comprises a ripening agent.

16. The method of claim 1 wherein the gas comprises a preserving agent.

17. A method for shipping cargo in an enclosed, elongated cargo container van having opposed vertical side walls, a forward end wall, a rearward end wall, a roof and a floor so as to form an enclosed space, the enclosed space having a forward portion and a rearward portion, the method comprising the steps of:

(a) loading the cargo into boxes having a pair of opposed vertical side walls, a pair of opposed vertical end walls, a top wall and a bottom wall;

(b) disposing the boxes in a plurality of tiers within the cargo container to form a cargo load having a top side and a bottom side, the boxes being disposed within the cargo container such that boxes in the forward portion of the enclosed space are tightly packed proximate to the sidewalls and to the forward end wall, the boxes being disposed within the cargo container so as to provide a plurality of vertical channels spaced apart from the side walls and spaced apart from the forward end wall, the vertical channels each extending from the bottom of the cargo load to the top of the cargo load;

(c) disposing a baffle sheet horizontally across each vertical channel, at least some of the baffle sheets having one or more baffle sheet openings to allow the passage of gas through the baffle sheet, the number of baffle sheet openings in each baffle sheet being chosen so as to provide for a predetermined pressure gradient above the cargo load when a gas is circulated through the cargo load from the bottom of the cargo load to the top of the cargo load; and (d) commencing the circulation of a gas through the cargo load from the bottom of the cargo load to the top of the cargo load.

18. A method for shipping cargo in an enclosed, elongated cargo container van having opposed vertical side walls, a forward end wall, a rearward end wall, a roof and a floor so as to form an enclosed space, the enclosed space having a forward portion and a rearward portion, the method comprising the steps of:

(a) loading the cargo into boxes having a pair of opposed vertical side walls, a pair of opposed vertical end walls, a top wall and a bottom wall, the top wall of each box having a central portion, the top wall and the bottom wall of each box having ventilation openings defined therein, the boxes also having biased corners with corner vents defined therein;

(b) stacking the boxes in a plurality of tiers on individual pallet boards to form pallet board loads, the boxes being stacked one upon another such that the biased corners of each box are aligned with the biased corners of boxes disposed immediately below and immediately above, each pallet board load having a large baffle disposed across the top of one of the tiers in the pallet board load, the large baffle being continuous except for openings which are aligned with the central portion of the tops of each box in the tier upon which the large baffle is disposed;

(c) loading the pallet board loads into the cargo container to form a cargo load having a top side and a bottom side, the pallet board loads being disposed within the container such that the intersection of four pallet board loads forms a vertical channel extending from the bottom of the cargo load to the top of the cargo load; and (d) disposing a baffle sheet horizontally across each vertical channel, at least some of the baffle sheets having one or more baffle sheet openings to allow the passage of gas through the baffle sheet, the number of baffle sheet openings in each baffle sheet being chosen so as to provide for a predetermined pressure gradient above the cargo load when a gas is circulated through the cargo load from the bottom of the cargo load to the top of the cargo load.

19. The method of claim 18 wherein the large baffle further comprises at least one extension flap which projects outwardly from one side of the pallet board load.

* * * * *